United States Patent Office 3,450,509
Patented June 17, 1969

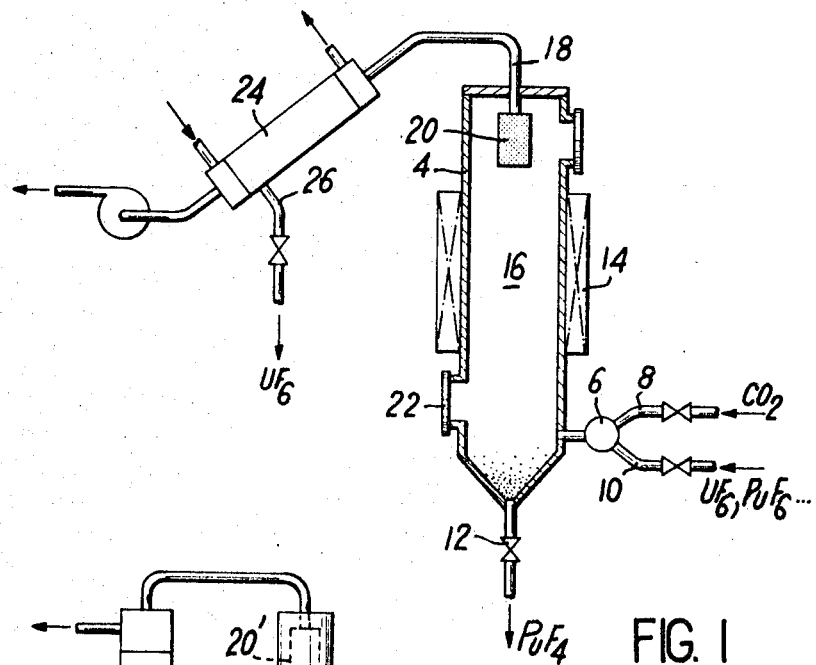
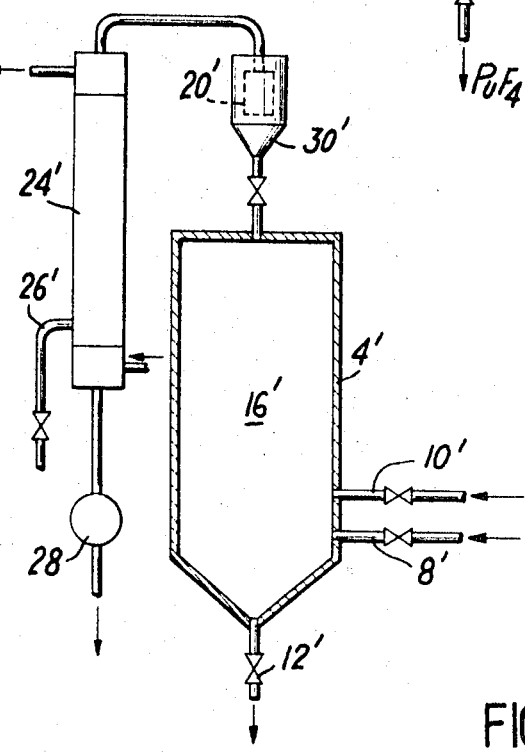

3,450,509
SELECTIVE REDUCTION OF $PuF_6$
Georges Manevy, Antony, France, assignor to Commissariat á l'Energie Atomique, Paris, France
Filed Nov. 21, 1967, Ser. No. 684,773
Claims priority, application France, Dec. 1, 1966, 85,866
Int. Cl. C01g 56/00
U.S. Cl. 23—344                                6 Claims

ABSTRACT OF THE DISCLOSURE

For selectively reducing $PuF_6$ present in a mixture containing $PuF_6$, $UF_6$ an eventual fission products, the mixture of hexafluorides is mixed with a proportion of $CO_2$ more than that stoichiometrically necessary and maintained at about 350° C. at a pressure of between 0.5 and 3 bars for a time sufficient for complete reduction of $PuF_6$. The process may be carried out either continuously by flowing the mixture through a vertical reaction vessel or in batches.

---

This invention is directed to a method of selective reduction of plutonium hexafluoride $PuF_6$ to plutonium tetrafluoride $PuF_4$ and to an apparatus for carrying out said method.

One important application among many others for which the method can be employed consists in the recovery of plutonium from irradiated nuclear fuels.

In addition, plutonium tetrafluoride constitutes an intermediate product in the preparation of plutonium metal and the reduction of the tetrafluoride to plutonium metal is carried out with correspondingly enhanced effectiveness as the tetrafluoride employed has a higher degree of purity and higher density.

The method which is most commonly employed during reprocessing of fuels for the recovery of fissile materials (uranium, plutonium) and for separating fission products on an industrial scale consists of extraction in solution by means of tributylphosphate (TBP), by means of long-chain tertiary amines such as trilaurylamine or by ion exchange.

Dry processing techniques have also been proposed in order to attenuate the disadvantages attached to wet processing techniques (notably the volumes of liquid, the dangers of criticality and radiolysis of solvents, and the abundance of effluents). In particular, the method which consists in volatilization of fluorides uses the difference which exists between the volatility of the fluorides of fission products and the volatility of the uranium and plutonium fluorides. Thus, the separation of uranium and plutonium fluorides is carried out in this process.

Either at the stage of production of the fluorides by employing a selective fluorinating agent (usually chlorine trifluoride or bromine pentafluoride) which makes it possible to volatilize the uranium alone in the form of hexafluoride.

Or starting from the mixture of the two hexafluorides which is prepared by direct action of the fluorine on the irradiated fuel; a whole series of processes can be employed for this purpose. Use can be made of a physicochemical process (selective thermal decomposition of plutonium hexafluoride on nickel wool, for example), a physical process entailing rectification of the liquefied mixture or finally, a purely chemical process which makes use of an agent for the selective reduction of plutonium hexafluoride.

All the dry processing routes referred-to above are subject to disadvantages: those which entail the use of a selective fluorinating agent are very attractive in principle but require reagents which are potentially dangerous and difficult to handle (chlorine trifluoride, for example) and must in addition be separated from the volatilized uranium hexafluoride. Rectification of the mixture of hexafluorides makes it possible in principle to achieve complete decontamination. However, the instability of plutonium hexafluoride makes it difficult to carry this method into practice. The selective thermal decomposition process, while effective for the separation of uranium and plutonium, makes it difficult to recover the solid plutonium tetrafluoride which has formed since this product is dispersed in the midst of a nickel packing which is in turn in a very highly divided state. Finally, in the present state of the art, it would seem that only sulphur tetrafluoride or certain chlorofluorinated organic substances (Freons 11 and 12) can be employed as agents for the selective reduction of plutonium hexafluoride. In point of fact, sulphur tetrafluoride is a costly reagent and difficult to use since it makes it necessary to operate in an agitated liquid medium. Its use seems therefore reserved for analytical purposes. Th Freons are reagents which are more commonly employed on an industrial scale but are sensitive to thermal and radiochemical effects. Their effectiveness and selectivity with respect to the different fluorides are in any case not wholly confirmed for the time being.

The aim of the present invention is to provide a method of selective reduction of plutonium hexafluoride which overcomes or at least attenuates the disadvantages attached to methods of the prior art, especially insofar as it entails the use of a reagent which is both effective, selective, easy to handle, and readily removed from the fissile materials which it entrains.

To this end, the invention proposes a method of selective reduction of plutonium hexafluoride to tetrafluoride, characterized in that it comprises contacting the mixture of hexafluorides with carbon dioxide $CO_2$ at a temperature within the range of 150° C. to 500° C. and preferably under an absolute pressure within the range of 0.5 to 4 bars for a sufficient period of time to produce the virtually complete reduction of the plutonium hexafluoride.

The expression "mixture of hexafluorides" which is adopted in order to simplify the terminology throughout this patent must be interpreted as designating not only the mixtures of hexafluorides of actinides but also mixtures containing, in addition to these hexafluoride, volatile fluorides and especially fission products fluorides (niobium pentafluoride, for example) and gaseous fission products.

In a preferred mode of execution of the invention, the molar ratio of carbon dioxide to the hexafluoride mixture is comprised between 5:1 and 20:1; in the case of a ratio of 20:1 which is taken by way of example, the time which is necessary for the total reduction of the plutonium hexafluoride is less than one minute.

The invention is also directed to an apparatus for the practical application of the method, comprising a vertical tubular reactor, means for injecting the mixture of hexafluorides and carbon dioxide at the bottom of the reactor, a pipe which connects the top of the reactor to a condenser which is maintained at a temperature below the points of liquefaction of the constituents of the mixture other than the plutonium hexafluoride and a valve for withdrawing the plutonium tetrafluoride from the bottom of the reactor.

The invention also consists in other arrangements which are preferably employed in conjunction with the preceding but which may be employed independently. These arrangements will become more readily apparent from the following description of embodiments of the invention which are given by way of examples only.

The description refers to the accompanying drawings, in which:

FIG. 1 shows very diagrammatically an apparatus for the continuous operation of the process in accordance with the invention;

FIG. 2, which is similar to FIG. 1, shows an apparatus for the application of the invention in the form of a non-continuous or batch process.

In both cases (continuous or non-continuous operation), the total reduction reaction, which only takes account of the general character of the phenomenon and not of transient conditions during which a small quantity of carbonyl fluoride $COF_2$ is formed, corresponds to the formula:

$$2PuF_6 + CO_2 \rightarrow 2PuF_4 + CF_4 + O_2$$

Under the conditions of temperature and pressure which are indicated above, neither uranium hexafluoride nor the majority of the volatile constituents of fission products (niobium pentafluoride and ruthenium pentafluoride in particular) are reduced.

The "continuous" process will be described first. This process essentially consists in continously injecting the mixture of hexafluorides and carbon dioxide which are maintained at a temperature below 150° C. at the bottom of a reaction space which is maintained at a temperature within the range of 150 to 500° C. and in withdrawing the plutonium tetrafluoride from the bottom of the space, whilst the residual mixture passes out at the top of said space.

As shown in FIG. 1, the apparatus for the application of the process comprises a tubular reactor 4 having a vertical axis. Said reactor has a diameter which is sufficiently small to avoid any danger of criticality and a length which is sufficient to ensure the minimum contacting time required for the complete reduction of $PuF_6$ under the chosen conditions of temperature, pressure and flow rate and for the production of plutonium tetrafluoride having a proportion of contaminants which does not exceed a predetermined value.

The reactor under consideration is internally burnished and formed of a material which is not attacked by the fluorides (preferably of "Monel" or nickel). A device for injecting the mixture of hexafluorides is fitted at the base of the side wall of the reactor and consists, for example, of a conventional injection pump 6. Said pump is supplied at low pressure through a pipe 8 for the admission of carbon dioxide gas and a pipe 10 for the admission of the mixture of hexafluorides, both pipes being fitted with a regulating valve and a check valve.

The bottom of the reactor is of frusto-conical shape and is fitted with a valve 12 for the withdrawal of reduced plutonium tetrafluoride.

Heating units which are represented diagrammatically in the form of a sleeve 14 and controlled by a regulating system (not shown) serve to maintain the temperature within the reaction space 16 defined by the reactor at a predetermined value within the range of 150° C. to 500° C. The top portion of the reactor is connected to a pipe 18 for discharging the mixture which is constituted by the unreduced products, excess carbon dioxide, oxygen and carbon tetrafluoride which are derived from the reaction. The inlet of said pipe 18 is fitted with one or a number of filters 20 of sintered nickel which are intended to stop the solid particles of plutonium tetrafluoride which might otherwise be carried away with the gas stream. An unclogging system (not shown) is evidently provided for the purpose of periodically cleaning the filters as well as pluggable openings such as the opening 22 which serve to gain access to the reactor walls for cleaning purposes.

The pipe 18 serves to feed a condenser 24 which is maintained by a flow of refrigerant at a temperature of −80° C., in which the uranium hexafluoride (unreduced in the reactor) and the fission products are trapped: the condensate which is collected through a draw-off pipe 26 is made up of unreduced products in solid form ($UF_6$, $RuF_5$, $NbF_5$ . . .) which are withdrawn in non-continuous operation. The residual gases which have not condensed pass out towards a ventilation circuit which aspirates the reaction products from the space 16.

The operation of the apparatus is apparent from the foregoing description: the plutonium hexafluoride contained in the mixture which is injected into the bottom of the reactor 4 and aspirated from the top undergoes the reduction reaction. The plutonium tetrafluoride is periodically drawn off through the valve 12. The uranium hexafluoride which is carried away by the gas stream as well as the fluorinated fission products are stopped by the condenser 24 whilst the reaction products other than the plutonium tetrafluoride (excess carbon dioxide, carbon tetrafluoride, oxygen, etc.) are carried away towards the ventilation system. Distillation of the condensate makes it possible to separate the uranium hexafluoride from the volatile fission products which contaminate this latter.

The batch processing apparatus which is shown in FIG. 2 is similar to the apparatus of FIG. 1 but comprises, instead of a continuous-circulation reactor, an autoclave 4′, the volume of which depends on the quantity to be processed per operation.

Said autoclave is maintained at a predetermined reduction temperature and is evacuated by means of a pumping unit 28, then filled with vapors of the hexafluoride mixture to be processed which is admitted through a pipe 10′. Carbon dioxide is then injected through a pipe 8′ in order to obtain a total pressure corresponding to the excess $CO_2$ which has previously been selected.

When the reduction time has expired, the residual gaseous mixture is drawn off by expansion and pumping through an ancillary filtration chamber 30 which is also fitted with filters 20′ of sintered nickel and an unclogging system. The reduced plutonium tetrafluoride is then withdrawn from the bottom of the autoclave through a valve 12′. In this case also, the gaseous mixture which is derived from the reactor passes through a condenser 24′ which is maintained at −80° C. in which the unreduced uranium hexafluoride is trapped as well as the volatile fluorides of fission products which contaminate this latter.

The minimum period of maintenance under reaction conditions depends on a number of factors, some being established by the nature of the mixture ($PuF_6$ in particular) whereas others are adjustable (temperature, $CO_2$ content, pressure, . . . ). In practice, the reaction should be permitted to proceed for a period which should preferably not be les than 1 minute. It is apparent that the reaction time should not exceed a value for which appreciable reduction of uranium hexafluoride occurs. In fact, for economc reasons, the time duration will always be set well below this maximum value which, under the usual operating conditions, would be of the order of one hour.

The results made possible by the invention are clearly shown by the two examples which follow. The first example corresponds to a laboratory experiment and the second corresponds to an actual industrial application of the process.

Example 1

In a reactor having a capacity of 250 ml. and formed of "Monel," a mixture of three grams of uranium hexafluoride and plutonium containing 50% plutonium hexafluoride was reduced at 300° C. by carbon dioxide at a partial pressure such that the total absolute pressure (fluorides and carbon dioxide) was 3 bars. After contacting for a period of one minute, the operation yielded a plutonium tetrafluoride of brick-red color in grains a few microns in diameter having a concentration of only 0.03% by weight of uranium.

The uranium hexafluoride which was withdrawn from the reactor through a nickel filter having a porosity of 50µ and condensed in a trap at −80° C. in order to separate it from the excess reagent had a concentration of only 0.01% by weight of plutonium, which corresponded to a plutonium decontamination factor of the order of $10^4$.

Example 2

The industrial utilization of the process corresponds to the reprocessing of a breeder reactor core, in which the fuel is a mixed oxide $UO_2$–$PuO_2$ containing 15% plutonium, at a rate of 2.5 kg. of fuel, i.e. approximately 7 moles per hour.

The conditions of reduction to be complied with in the case of the mixture derived from the fluorination of the fuel are as follows:

Molar ratio _____ $CO_2/UF_6+PuF_6=5$
Temperature _____° C__ 350
Absolute pressure _____kg./cm.$^2$__ 4
Minimum time of residence of the mixture in the reactor _____min__ 1 which results in the following admission rates in continuous operation:

$CO_2$ _____moles/hour__ 35
$UF_6+PuF_6$ _____do____ 7

The reagents (mixture of hexafluorides and $CO_2$) can be introduced as shown in FIG. 1. A variant consists in saturating the $CO_2$ stream with the mixture $UF_6$–$PuF_6$ by passing through an evaporator containing the mixture and maintained at a sufficient temperature, then in injecting saturated $CO_2$ into the reactor.

In order to have a residence time of more than 1 minute in the case of a reactor having a diameter of 10 cm., the length must be greater than 114 cm.; in practice, a length of 200 cm. is adopted in order to have a sufficient safety margin.

There are collected at the bottom of the reactor 1.05 mole/hour, namely 300 g./hour, of $PuF_4$. At the outlet of the condenser, there are collected 5.95 mole/hour, namely 2094 g./h. of $UF_6$ containing less than 0.01% by weight of plutonium: this proportion corresponds to 0.06% by weight of the plutonium employed. Should this loss seem excessive, the greater part of the plutonium can in any case be recovered by placing a thermal decomposition column (not shown in the drawings) between the reactor 16 and the condenser 24.

The economic, chemical and technological advantages of the invention with respect to the processes of the prior art have been brought out by the foregoing description: carbon dioxide is an inexpensive reagent which is readily obtained with a sufficient degree of purity and which can easily be stored. It possesses the highest degree of selectivity and efficiency which are necessary for the virtually complete reduction of plutonium hexafluoride without producing simultaneous action on the other fluorides. It has high temperature and irridation stability. Handling of carbon dioxide does not give rise to any problem since it is non-toxic. It can readily be separated from the unreduced fluorides by means of a simple pumping operation at −80° C. The fact that, at the time of reduction, carbon dioxide gives rise to gaseous reaction products which have a low boiling point ($CF_4$, oxygen, carbonyl fluoride) makes it particularly easy to carry out operations entailing the recovery of uranium hexafluoride. The fact of operating in homogeneous phase and without coatings makes the recovery of solid plutonium tetrafluoride a relatively easy process. Finally, it should be noted that the invention applies to mixtures containing all proportions of plutonium from a few fractions of p.p.m. up to near 100% (mase of pure plutonium hexafluoride to be decontaminated).

It will be apparent that the invention is not limited solely to the modes of execution which have been described in detail in the foregoing, and it must be understood that the scope of this patent extends to any equivalent method and apparatus. In particular, the present invention includes within its scope such variants as those in which carbon dioxide gas is employed for selectively reducing plutonium hexafluoride in a mixture of gaseous or liquid fluorides; in this latter case, the carbon dioxide can be contacted with the mixture which is maintained in the liquid state by bubbling techniques, porous diffusers, countercurrent flow, mechanical agitation and reaction in a pressure vessel.

I claim:
1. A process of selectively reducing plutonium hexafluoride present in a mixture including $UF_6$ and $PuF_6$ into plutonium tetrafluoride, comprising mixing these hexafluorides with $CO_2$ at a temperature of between 150° C. and 500° C. under a pressure between 0.5 bar and 4 bars to cause preferential reduction of the plutonium hexafluoride into plutonium tetrafluoride by the carbon dioxide.

2. A process according to claim 1, wherein $CO_2$ is added in an amount in excess of that stoichiometrically necessary for the reduction of $PuF_6$.

3. A process according to claim 2, wherein the molar proportion between $CO_2$ and all hexafluorides present in the mixture is of between 5 and 20.

4. A process of separating plutonium from uranium comprising: maintaining a vaporous mixture of the hexafluorides of these metals and of carbon dioxide at a temperature between 150° C. and 500° C. and at a pressure of approximately 0.5 bar to 4 bars whereby $PuF_6$ is reduced to solid $PuF_4$ while $UF_6$ remains unreacted; collecting said $PuF_4$; and cooling the remaining gaseous mixture to a temperature lower than the boiling temperature of $UF_6$ whereby $UF_6$ is condensed while the other products present in the remaining gaseous mixture remain gaseous.

5. A process according to claim 4, wherein the temperature is about 350° C.

6. A process according to claim 4, wherein said vaporous mixture is continuously injected into the lower portion of a reaction zone and wherein the products other than $PuF_4$ resulting from the reaction are continuously removed from the upper portion of said zone.

References Cited

J. J. Barghusen, Volitility Processes, Reactor Fuel Processing, vol. 9, No. 2, July 11, 1966, p. 88–9.

CARL D. QUARFORTH, Primary Examiner.

M. J. McGREAL, Assistant Examiner.

U.S. Cl. X.R.

23—352